United States Patent

Ray et al.

[11] Patent Number: 5,505,579
[45] Date of Patent: Apr. 9, 1996

[54] SLIDING CARRIER

[75] Inventors: Ralph D. Ray, Boulevard; Jon Apogee, Mira Loma; Richard L. Ireland, Upland; Michael E. Turgeon, San Diego, all of Calif.

[73] Assignee: Sport Carriers, Incorporated, Colton, Calif.

[21] Appl. No.: 303,031

[22] Filed: Sep. 8, 1994

[51] Int. Cl.⁶ ........................................ B60P 9/00
[52] U.S. Cl. .................... 414/462; 414/522; 224/310
[58] Field of Search ........................ 414/462, 463, 414/464, 466, 522, 538; 224/309, 310

[56] References Cited

U.S. PATENT DOCUMENTS

| | | |
|---|---|---|
| 2,931,528 | 4/1960 | Mabry . |
| 3,048,291 | 8/1962 | Mabry . |
| 3,193,124 | 7/1965 | Essling . |
| 3,480,166 | 11/1969 | Abbott ................................ 414/538 |
| 3,527,371 | 9/1970 | Townsend, Jr. . |
| 3,581,962 | 6/1971 | Osborn . |
| 3,642,157 | 2/1972 | Williams, Jr. ......................... 414/522 |
| 3,687,318 | 8/1972 | Casey et al. . |
| 3,734,321 | 5/1973 | Long et al. . |
| 3,927,779 | 12/1975 | Johnson . |
| 3,972,433 | 8/1976 | Reed . |
| 4,058,243 | 11/1977 | Tappan ................................ 414/462 |
| 4,081,095 | 3/1978 | Wilburn et al. ...................... 414/522 |
| 4,234,285 | 11/1980 | Martinez . |
| 4,239,438 | 12/1980 | Everson . |
| 4,274,788 | 6/1981 | Sutton . |
| 4,442,961 | 4/1984 | Bott . |
| 4,702,401 | 10/1987 | Graber . |
| 4,953,757 | 9/1990 | Stevens et al. . |
| 5,042,705 | 8/1991 | Johansson . |
| 5,069,595 | 12/1991 | Smith et al. . |
| 5,071,308 | 12/1991 | Tibbet . |
| 5,203,484 | 4/1993 | Englander . |
| 5,232,329 | 8/1993 | Livingston ............................ 414/462 |
| 5,284,282 | 2/1994 | Mottino . |

Primary Examiner—Michael S. Huppert
Assistant Examiner—Douglas A. Hess
Attorney, Agent, or Firm—Lyon & Lyon

[57] ABSTRACT

A sliding carrier comprising a frame and a sled, with the frame being mounted to the rooftop of a vehicle, and the sled adaptable for carrying certain objects being in sliding communication with the frame. The sled unlocks and slides out of the frame to a rearmost horizontal deployment position. The sled releases from the horizontal plane of travel into a pivoting plane of travel by lifting and pulling the sled over a stop block. The sled then pivots about a rearward wheel assembly until a landing gear assembly contacts the ground. A winch assembly is then used to control the further lowering of the sled from a grounded position to a loading position, at which time certain objects may be loaded onto the sled. The sled is returned to a locked traveling position atop the vehicle by reversing the steps above.

16 Claims, 13 Drawing Sheets

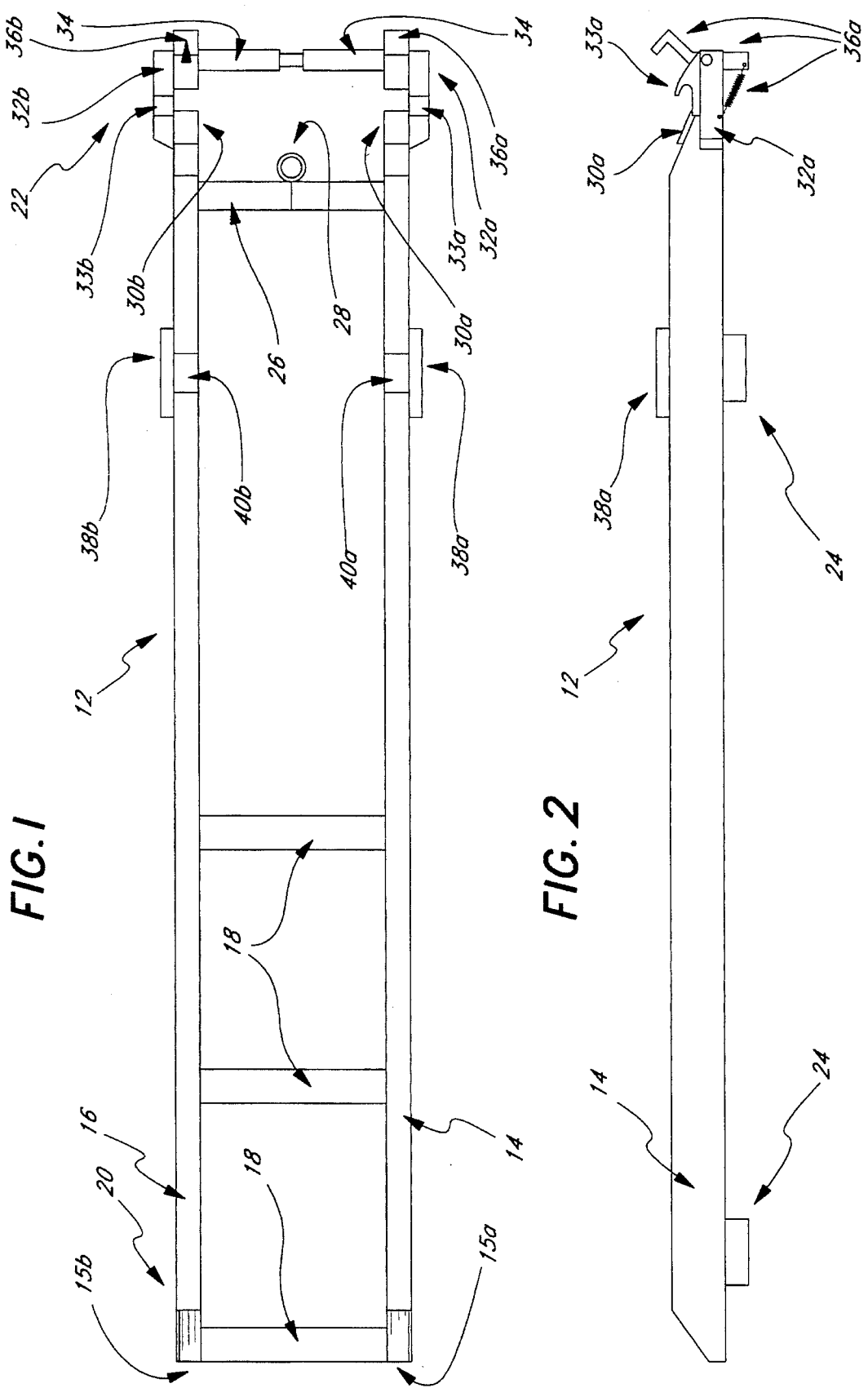

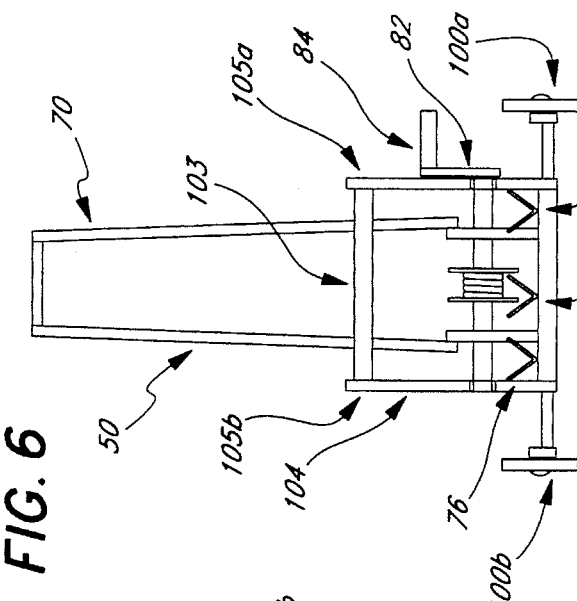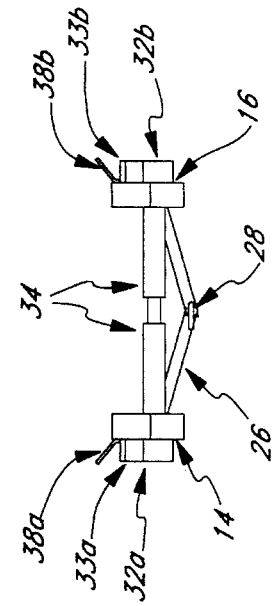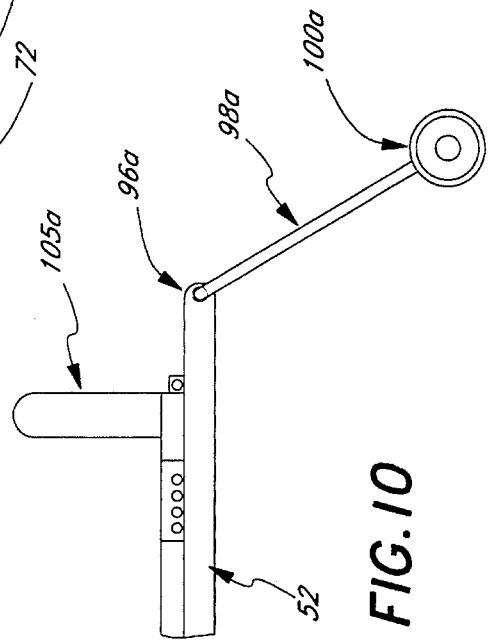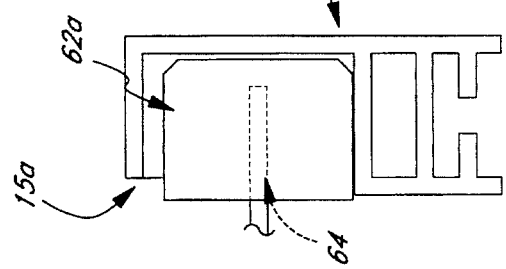

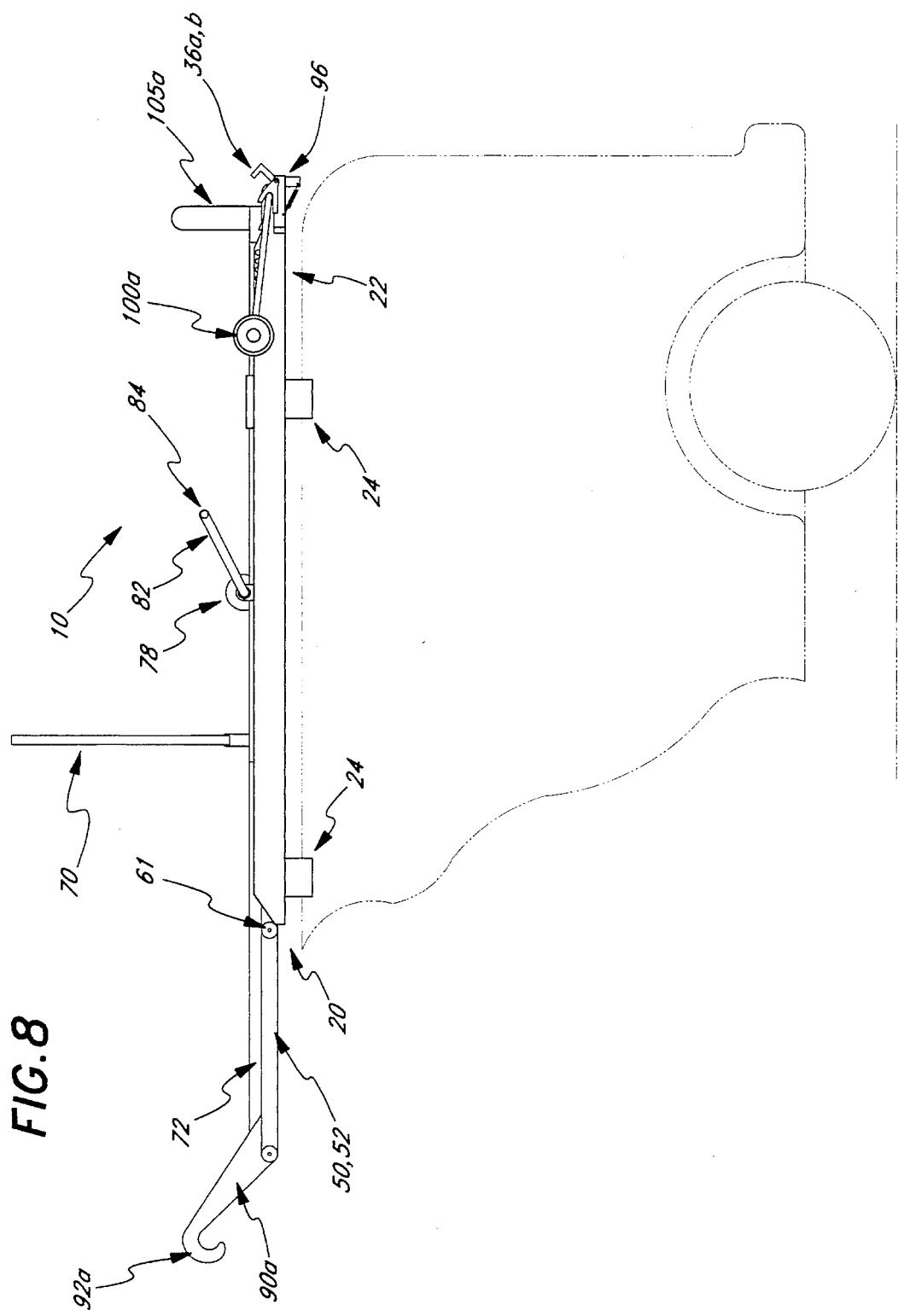

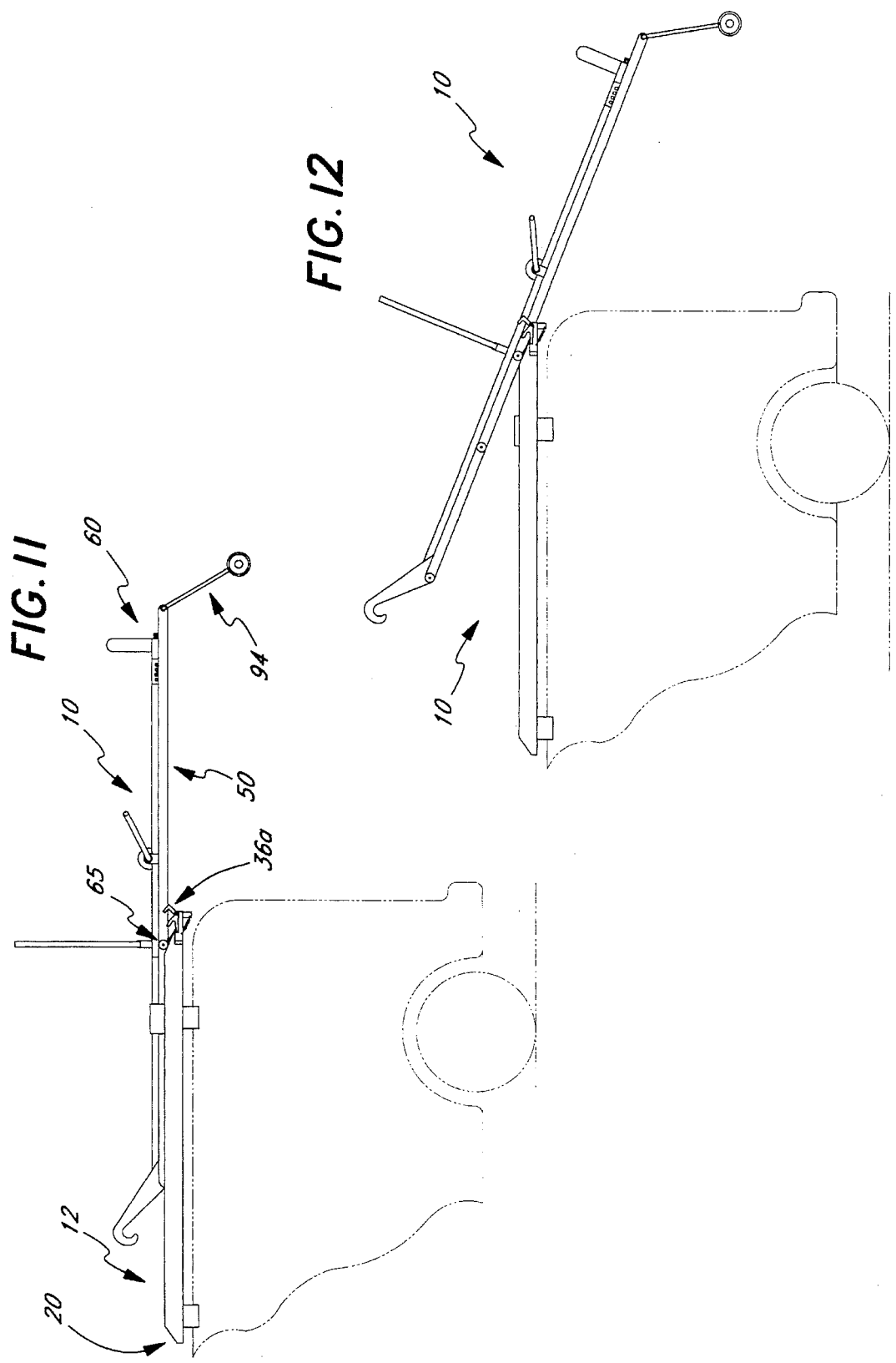

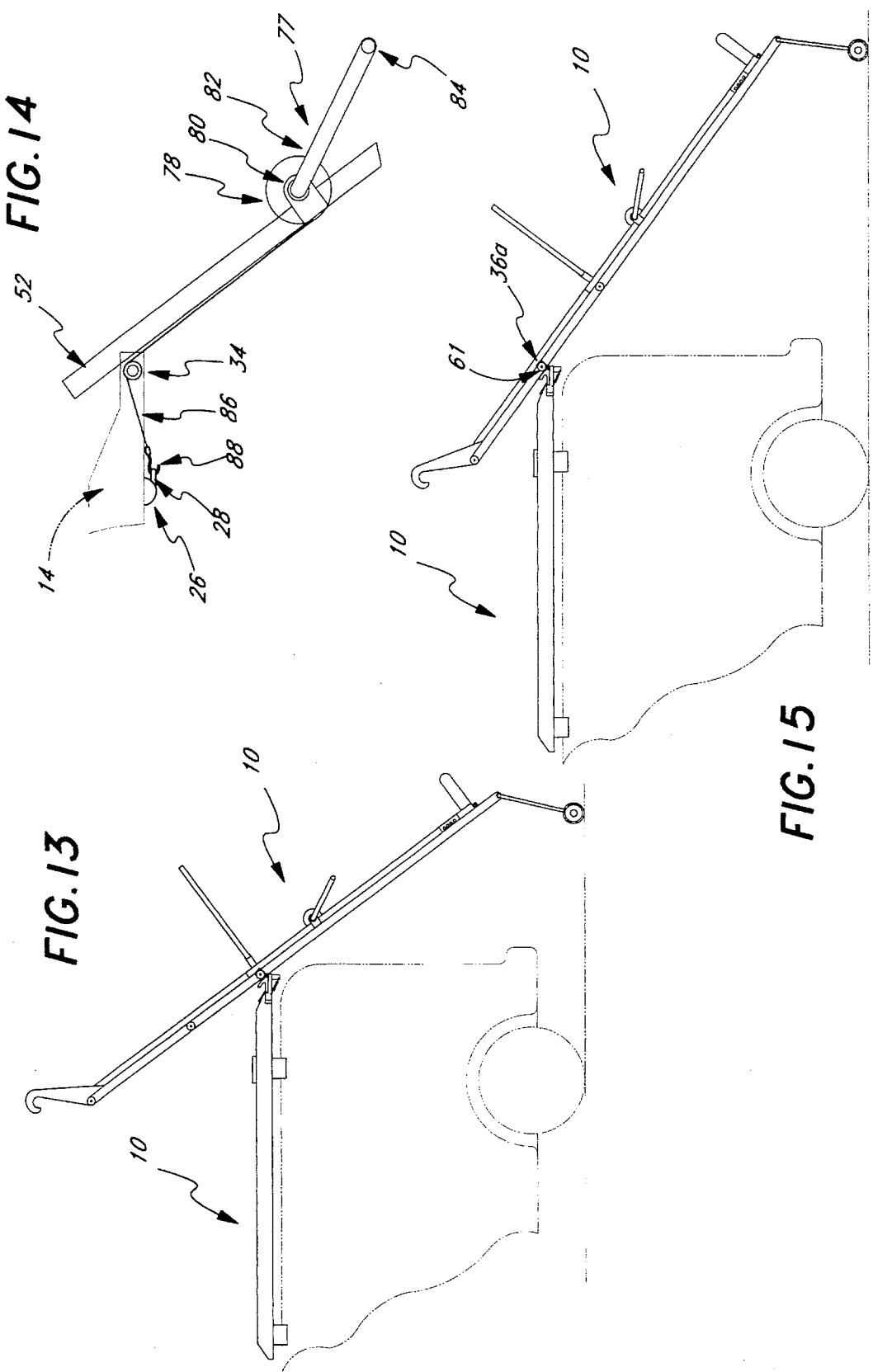

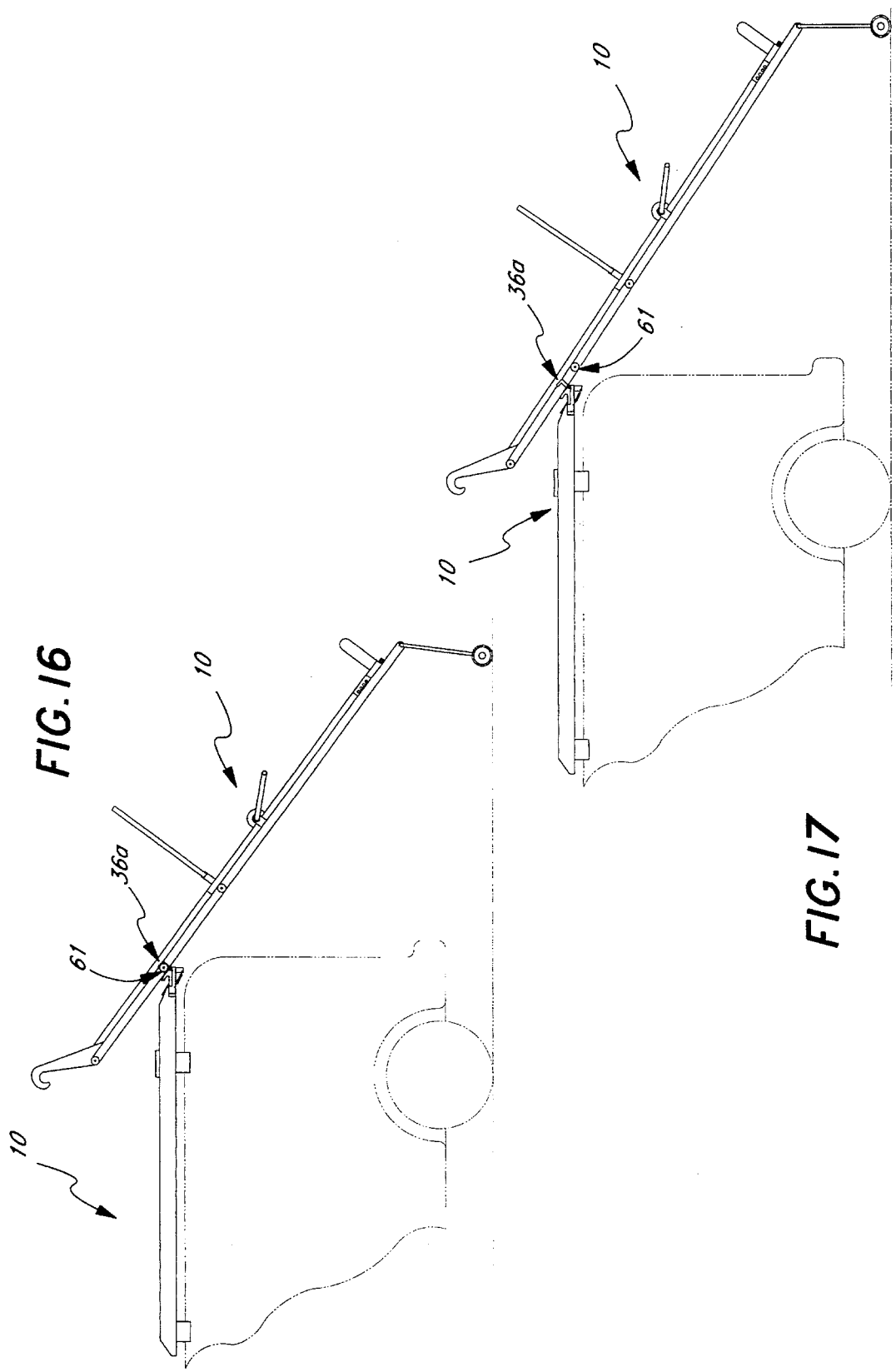

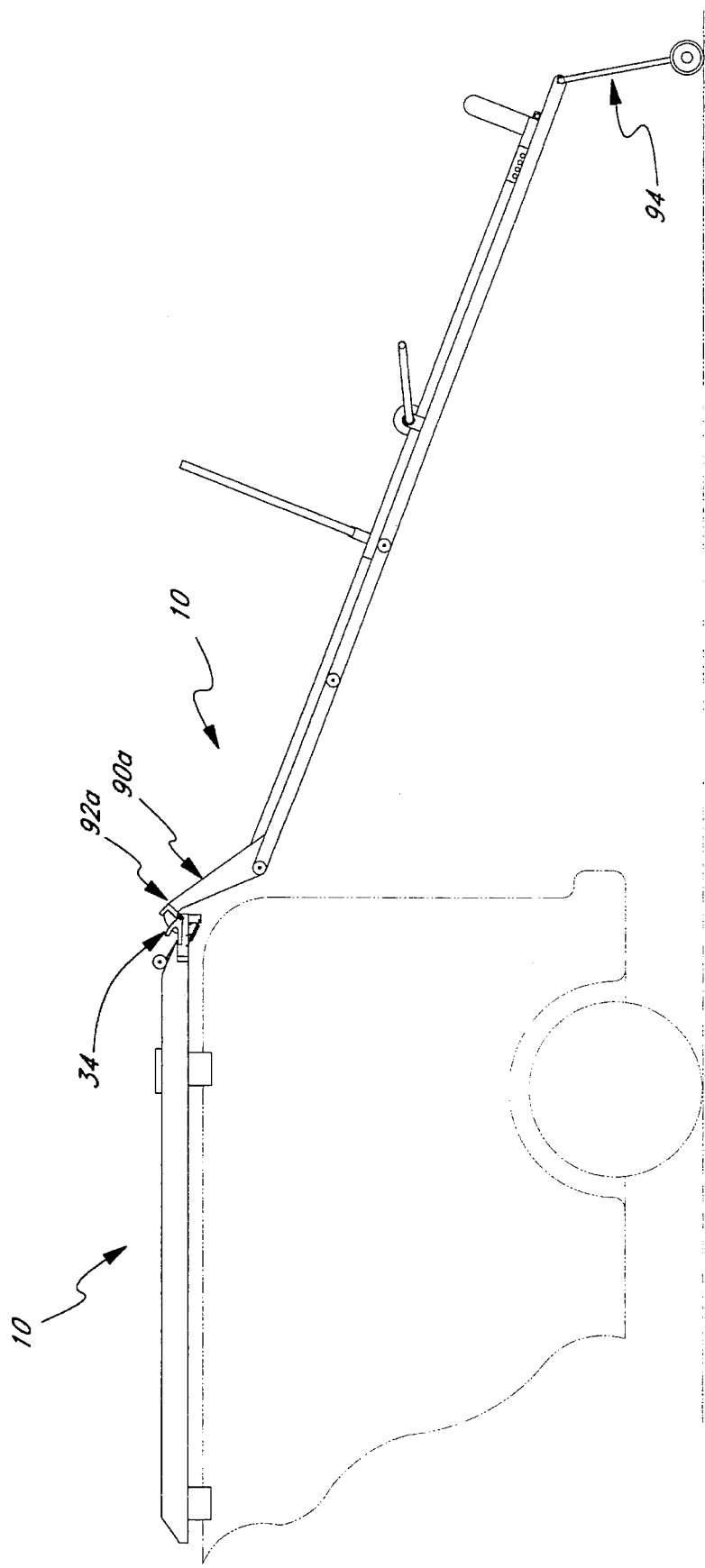

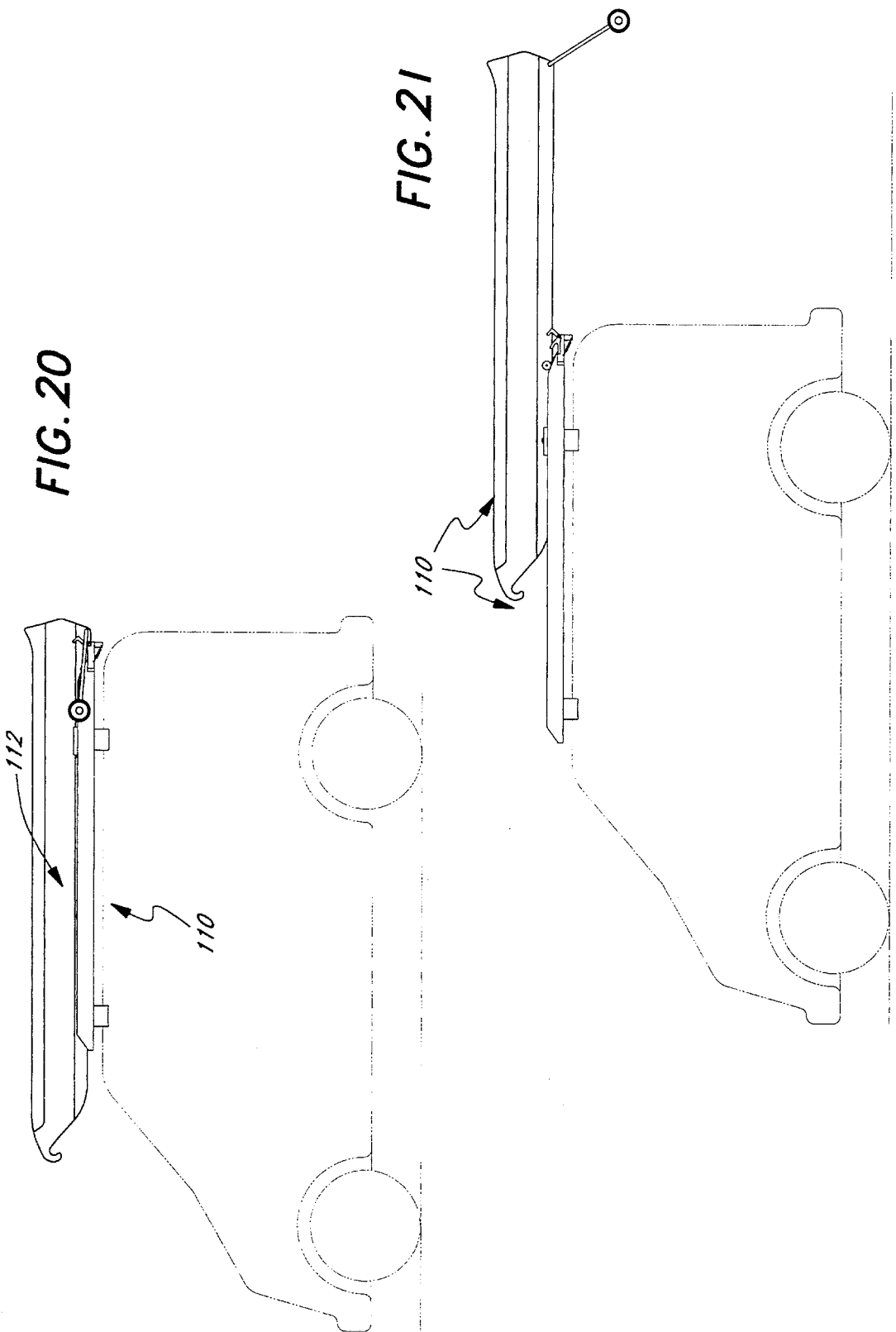

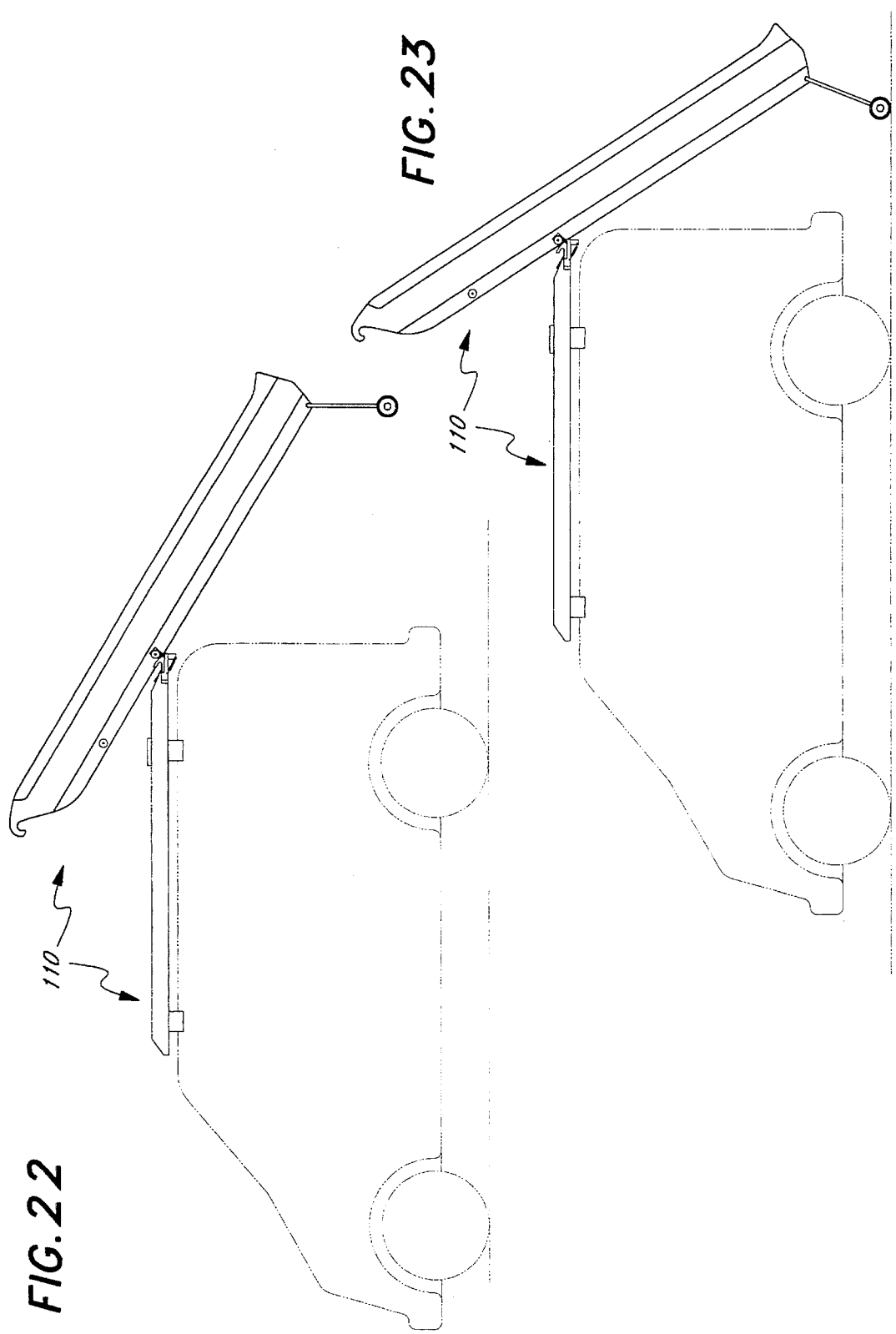

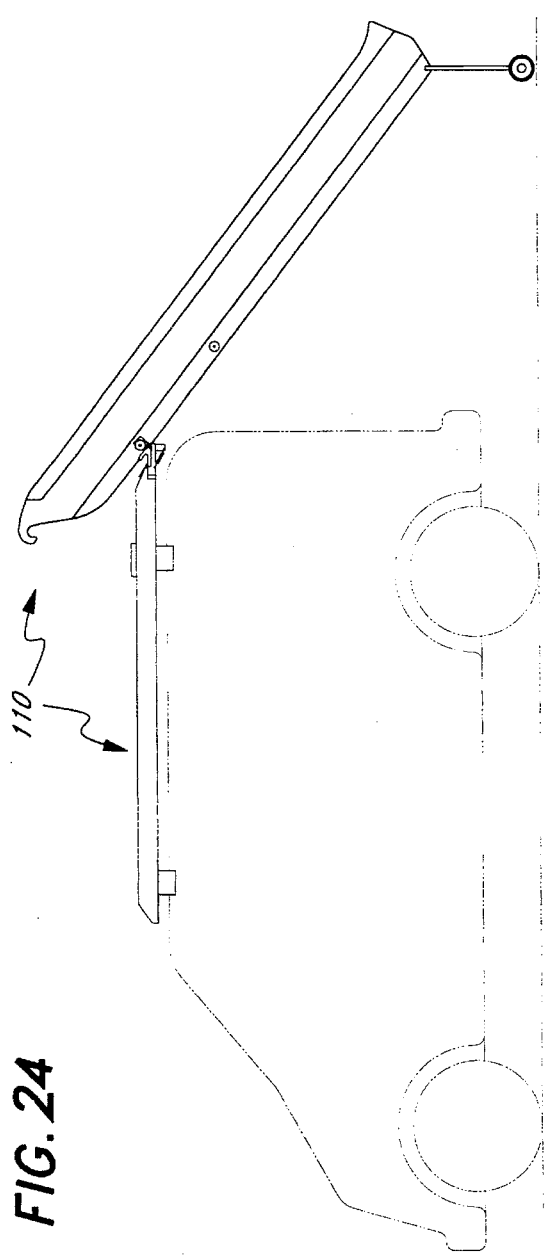
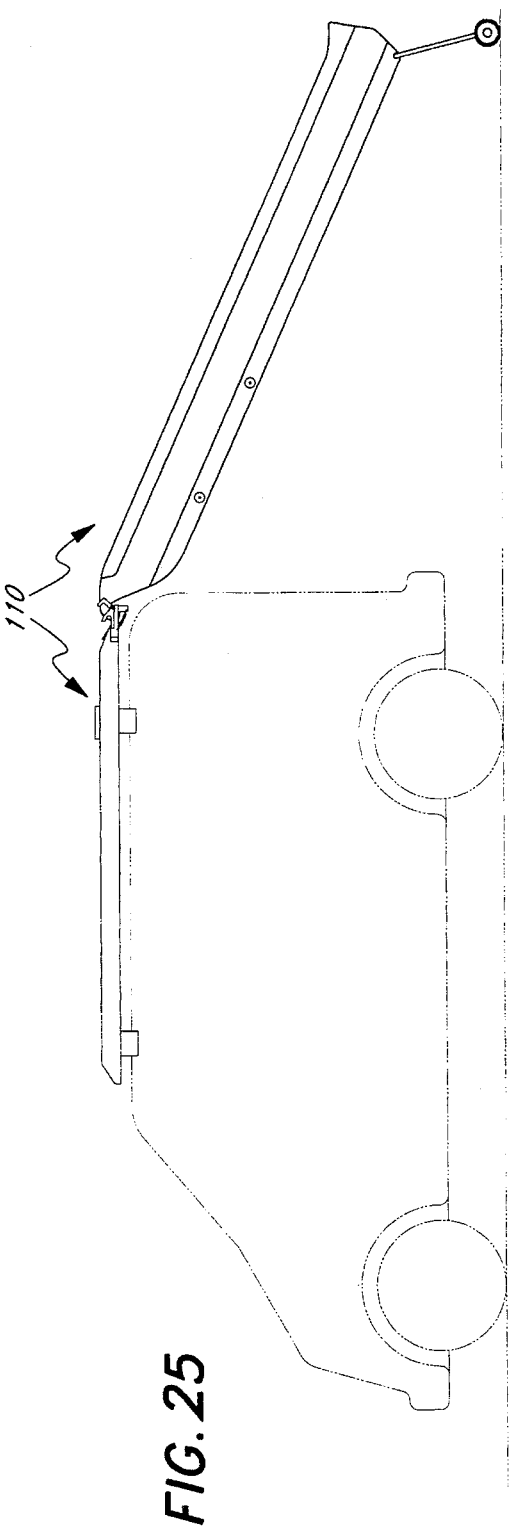

SLIDING CARRIER

FIELD OF THE INVENTION

This invention relates to carriers, and more specifically to a vehicle roof-mounted sliding carrier.

BACKGROUND OF THE INVENTION

While there are many conceivable ways to carry an object, such as a bike, on the exterior of a vehicle, one general classification encompasses roof-mounted bike carriers. While the term "roof" is used, it is understood that this also includes mounting on top of vehicles such as trucks, where the bike carrier is mounted over the truck bed.

Basically, there are two types of bike carriers being used today to transport bikes on the rooftop of a vehicle. There is a fork-mount bike carrier and a ride-ready bike carrier.

In the first type of bike carrier, the fork-mount bike carrier, the front wheel of the bicycle must be removed so that the front wheel forks can be mounted and secured into a holding device. By securing the front wheel forks, the bicycle is further stabilized. The rear wheel remains attached to the bike and is secured to the bike carrier via a wheel holding device.

In the second type of bike carrier, the ride-ready bike carrier, the user can transport a bicycle without having to remove the front wheel. This means that the bike is ready to ride, without any assembly required, when removed from the ride-ready bike carrier. With the ride-ready bike carrier, both the front and rear wheels are secured to the bike carrier via a wheel holding device. For further security and stability, the bike frame can be stabilized through the use of a support arm.

However, both of these bike carriers have some shortcomings. For example, one of the disadvantages of the first type of carrier, the fork-mount bike carrier, is that it is inconvenient and time consuming to remove the front wheel from the bike whenever the bike is mounted to the carrier, and to put the front wheel back on whenever the bike is removed from the carrier.

Furthermore, one of the disadvantages of the second type of carrier, the ride-ready bike carrier, is that the placement of the bike carrier on the rooftop of the vehicle makes it difficult for some people to lift their bikes above the rooftop of the vehicle, and then mount it to the carrier. The height of the roof-mounted bike carrier sometimes requires the use of a step-ladder, chair, or other means of elevating the person comfortably above the rooftop of the vehicle. Although the use of such an object is inconvenient and can be dangerous, it is almost a necessity for taller vehicles and/or shorter people.

These height disadvantages also exist in other implementations of roof-mounted carriers, such as enclosed cargo compartments, which are difficult to load due to their elevated placement atop a vehicle.

Referring back to the bike carriers, in both the fork-mount and ride-ready bike carriers, a plurality of bikes are typically mounted in a side-by-side configuration. This creates a substantial amount of aerodynamic drag when mounted on a vehicle traveling at freeway speeds, thereby reducing the gas mileage of the vehicle.

Therefore, there is a need for a carrier that simplifies the loading and carrying of objects on the rooftop of vehicles. There is also a need for an improved carrier that gives a user the option to transport a bike in a ride-ready or fork-mount configuration, and further enables that user, regardless of the height of the vehicle or the person, to attach their bike to the roof-mounted bike carrier without the use of a step-ladder, chair, or other inconvenient and potentially dangerous object. Furthermore, there is a need for an improved bike carrier that reduces the aerodynamic drag created by a plurality of bikes mounted on top of the vehicle.

SUMMARY OF THE INVENTION

One implementation of the vehicle roof-mounted sliding carrier of the present invention is a roof-mounted sliding ride-ready bike carrier. The roof-mounted sliding ride-ready bike carrier of the present invention provides the benefits of a typical roof-mounted ride-ready bike carrier, while providing an additional benefit of enabling most people, regardless of their height or the height of their vehicle, to easily mount and ensure the proper installation of a bike onto a roof-mounted ride-ready bike carrier.

Since the bike carrier of the present invention allows the user to mount their bike to the bike carrier when the bike carrier is in a lowered position, the necessity for a stepladder, chair, or other similar object, is greatly reduced. In addition, the bike carrier of the present invention provides for the placement of a plurality of bikes in a staggered position such that a drafting effect is created, thereby decreasing the aerodynamic drag created by the frontal volume of the bikes.

The roof-mounted sliding ride-ready bike carrier of the present invention comprises a frame and sled configuration. The frame is mounted to the rooftop of a vehicle. The sled slides out from the frame toward the rear end of the vehicle and rotates about a pivot point down to the ground. The sled is then further lowered to a loading position, and one or more bikes are mounted to the sled preferably in a staggered aerodynamically efficient configuration. The sled is then raised up and rotated back to the horizontal position, and slid back into the frame.

Although not described herein, the sliding ride-ready bike carrier of the present invention can also be designed as a fork-mount bike carrier.

Another implementation of the vehicle roof-mounted sliding carrier of the present invention is a roof-mounted sliding enclosed cargo compartment carrier. By incorporating the benefits derived from the vehicle roof-mounted sliding carrier of the present invention, the roof-mounted sliding enclosed cargo compartment carrier provides an additional benefit of enabling most people, regardless of their height or the height of their vehicle, to easily load cargo into the enclosed cargo compartment carrier.

Accordingly, it is an object of the present invention to provide a sliding carrier.

It is a further object of the present invention to provide a vehicle roof-mounted sliding carrier.

An additional object of the present invention is to provide a vehicle roof-mounted sliding ride-ready bike carrier that provides the benefits of a roof-mounted ride-ready bike carrier, while providing an additional benefit of enabling most people, regardless of their height or the height of the vehicle, to easily mount a bike onto the roof-mounted sliding ride-ready bike carrier.

Yet another object of the present invention is to provide a vehicle roof-mounted sliding ride-ready bike carrier that reduces the aerodynamic drag of carrying a plurality of bikes on top of a vehicle by placing the bikes in a staggered configuration.

Still another object of the present invention is to provide a vehicle roof-mounted sliding enclosed cargo compartment carrier that provides an additional benefit of enabling most people, regardless of their height or the height of their vehicle, to easily load cargo into the enclosed cargo compartment carrier.

Further objects and advantages of the present invention will become apparent from a consideration of the drawings and ensuing description.

BRIEF DESCRIPTION OF THE DRAWINGS

FIG. 1 is a top elevational view of a bike carrier frame.

FIG. 2 is a side elevational view of the bike carrier frame.

FIG. 3 is a rearward elevational view of the bike carrier frame.

FIG. 6 is a forward elevational view of the bike carrier sled.

FIG. 7 is a cutaway forward elevational view of a channel in a side rail of the bike carrier sled, with a sled wheel and axle shown in the channel.

FIG. 8 is a side elevational view of the bike carrier shown mounted onto the rooftop of a vehicle, with the bike carrier in a locked traveling position.

FIG. 9 is a partial side elevational view of a rearward portion of the bike carrier sled, showing a landing gear in a closed position.

FIG. 10 is a partial side elevational view of a rearward portion of the bike carrier sled, showing a landing gear in an open position.

FIG. 11 is a side elevational view of the bike carrier shown mounted onto the rooftop of the vehicle, with the bike carrier in a maximum horizontal deployment position.

FIG. 12 is a side elevational view of the bike carrier shown mounted onto the rooftop of the vehicle, with the bike carrier shown pivoting about a rearward wheel assembly. For clarity, the user is not shown offsetting the gravitational pivoting forces on the sled.

FIG. 13 is a side elevational view of the bike carrier shown mounted onto the rooftop of the vehicle, with the bike carrier in a grounded position.

FIG. 14 is a detailed view of a proper attachment of the sled's winch assembly to the frame's loop.

FIG. 15 is a side elevational view of the bike carrier shown mounted onto the rooftop of the vehicle, with a forward wheel assembly of the sled engaging a latch on the frame.

FIG. 16 is a side elevational view of the bike carrier shown mounted onto the rooftop of the vehicle, with the latch shown rotated down in the forward direction so as to clear the forward wheel assembly. The user that is required to manually operate the latch is not shown.

FIG. 17 is a side elevational view of the bike carrier shown mounted onto the rooftop of the vehicle, with the forward wheel assembly shown lowered past the latch. The latch springs back in the rearward direction after the forward wheel assembly passes over the latch.

FIG. 18 is a side elevational view of the bike carrier shown mounted onto the rooftop of the vehicle, with the bike carrier in a loading position. A ramp hook on the sled attaches to a roller on the frame, and the winch assembly remains secured to the loop.

FIGS. 20–26 are side elevational views of a vehicle roof-mounted sliding enclosed cargo compartment carrier during different stages of operation.

DETAILED DESCRIPTION OF A PREFERRED EMBODIMENT

Figure 4:
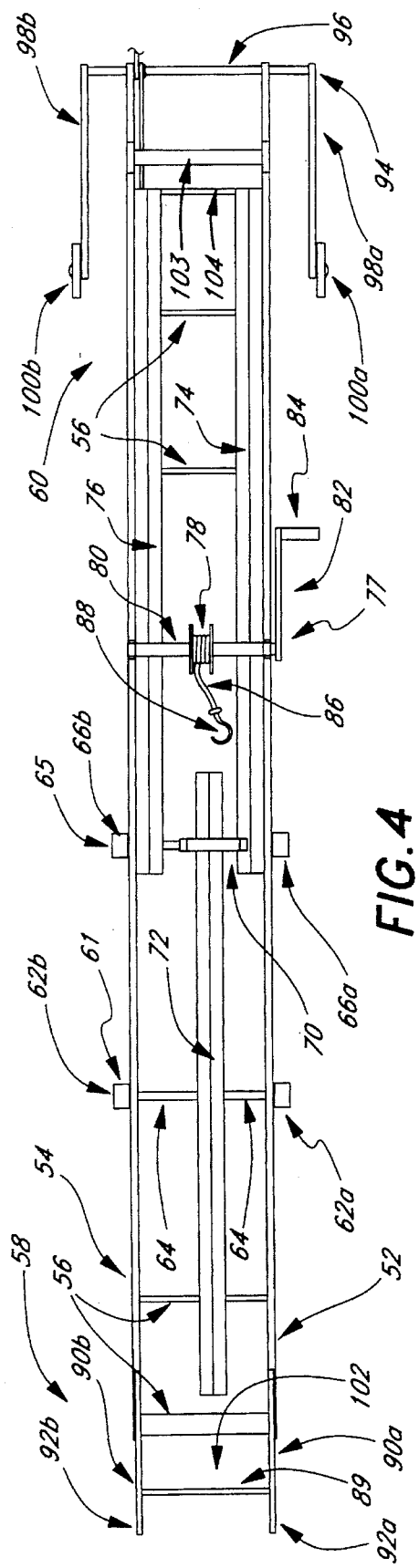
FIG. 4 is a top elevation view of a bike carrier sled.

FIGS. 1, 2 and 3 illustrate a top, side, and rearward elevational view, respectively, of a frame 12 for a sliding ride-ready bike carrier 10 (as fully shown in FIG. 11). The sliding ride-ready bike carrier 10 is one implementation of a sliding carrier of the present invention. Another implementation of the sliding carrier is a vehicle roof-mounted sliding enclosed cargo compartment carrier 110, which is discussed below in conjunction with FIG. 20.

Referring back to FIGS. 1, 2, and 3, the frame 12 comprises a first side rail 14 and a second side rail 16, with a plurality of substantially parallel crossmembers 18 attached between the first side rail 14 and the second side rail 16 in a substantially perpendicular orientation relative to the two side rails 14 and 16 such that the two side rails 14 and 16 are positioned substantially parallel to each other. To provide a frame of reference, one end of the frame 12 is called a forward end 20 and the other end of the frame 12 is called a rearward end 22. This corresponds to a proper placement of the forward end 20 of the frame 12 closer to a vehicle's front end (not shown), and the rearward end 22 of the frame 12 closer to a vehicle's rear end (not shown).

The frame 12 is mounted to a vehicle's rooftop via a plurality of frame mounts 24. Near the rearward end 22 of the frame 12, a loop crossmember 26 comprising a loop 28 is attached between the first and second side rails 14 and 16. This loop 28 is used to assist in the lowering of a sled 50 (shown in FIG. 4), as is explained in the discussion below of the operation of the bike rack 10.

The first side rail 14 is shaped so as to define a first channel 15a for receiving a first forward sled wheel 62a (shown in FIG. 4) and a first rearward sled wheel 66 (shown in FIG. 4). The second side rail 16 is shaped so as to define a second channel 15b for receiving a second forward sled wheel 62b (shown in FIG. 4) and a second rearward sled wheel 66b (shown in FIG. 4). Near the rearward end 22 of the first and second side rails 14 and 16 are first and second stop blocks 30a and 30b respectively, which are used to control to insertion and extraction of the sled 50 from the frame 12.

Placed at the rearward end 22 of the frame 12 are a first outrigger 32a and a second outrigger 32b, a first lock block 33a and a second lock block 33b, a roller 34 for assisting in the raising and lowering of the sled 50, and a first and second spring loaded latch 36a and 36b for maintaining the sled 50 in a proper position relative to the frame 12 during operation. The first and second outriggers 32a and 32b hold the roller 34, as well as the first and second spring loaded latch 36a and 36b to the frame 12. The first and second lock blocks 33a and 33b are appropriately positioned and attached to the first and second outriggers 32a and 32b as the final step in manufacture so as to mitigate lengthwise tolerances and variations, thereby minimizing sled 50 rattling within the frame 12. The first and second lock blocks 33a and 33b are designed to engage and exert a downward force on a landing gear axle 96 attached to the sled 50, thereby securely locking the sled 50 to the frame 12.

Placed away from the rearward end 22 about a quarter way toward the center of the frame 12 on the side rails 14 and 16 are a first wheel guide 38*a*, a second wheel guide 38*b*, a first frame slot 40*a*, and a second frame slot 40*b*.

FIG. 2 illustrates a side view of the frame 12 showing the first side rail 14, the frame mounts 24, the first wheel guide 38*a*, the first spring loaded latch 36*a*, the first outrigger 32*a*, and the first stop block 30*a*.

FIG. 3 shows a view of the frame 12 comprising the first and second side rails 14 and 16, looking from the rearward end 22 of the frame 12. The loop crossmember 26 is preferably positioned slightly lower than the crossmembers 18 (FIG. 1) and the roller 34, such that the loop 28 is more easily accessible. FIG. 3 also provides a different perspective view of the wheel guides 38*a* and 38*b*. The loop 28 and wheel guides 38*a* and 38*b* are more fully discussed in conjunction with the discussion below of the operation of the bike carrier 10 (FIG. 11).

FIG. 4 shows a top view of the sled 50 and all of its associated components. The sled 50 comprises a first sled side rail 52 and a second sled side rail 54 with a plurality of substantially parallel sled crossmembers 56 attached between the first sled side rail 52 and the second sled side rail 54 in a substantially perpendicular orientation relative to the two side rails 52 and 54 such that the two side rails 52 and 54 are positioned substantially parallel to each other. Analogous to the labeling of the frame 12, the sled 50 comprises a sled forward end 58 and a sled rearward end 60.

Placed approximately a quarter of the way from the sled forward end 58 is a forward wheel assembly 61 comprising the first forward sled wheel 62*a*, the second forward sled wheel 62*b*, and a forward sled wheel axle 64. The forward sled wheels 62*a* and 62*b* are located on the outside of the sled side rails 52 and 54, and are connected to the forward sled wheel axle 64, which extends preferably from the first sled side rail 52 to the second sled side rail 54. Alternatively, a split axle may be used.

Placed approximately in the center of the first and second sled side rails 52 and 54 is a rearward wheel assembly 65 comprising the first rearward sled wheel 66*a*, the second rearward sled wheel 66*b*, and a rearward sled wheel axle 68. The rearward sled wheels 66*a* and 66*b* are located on the outside of the sled side rails 52 and 54, and are connected to the rearward sled wheel axle 68 (not shown), which preferably extends from the first sled side rail 52 to the second sled side rail 54. Again, a split axle may be used.

Placed on the sled 50 approximately above the rearward wheel assembly 65 is a mast 70 (better shown in FIG. 6) for providing lateral support to a mounted bike.

Attached to the sled crossmembers 56 of the sled 50 are a forward bike tray 72, a first rearward bike tray 74, and a second rearward bike tray 76. Each tray 72, 74, and 76, is capable of receiving one bike in a ride-ready position for mounting to the sliding ride-ready bike carrier 10 (FIG. 11). The forward bike tray 72 is positioned between the first rearward bike tray 74 and second rearward bike tray 76. In a preferred embodiment, the forward bike tray 72 is off-centered and placed closer to the first rearward bike tray 74 by attaching the forward bike tray 72 to the sled crossmembers 56 at the appropriate off-centered location. This is desirable since bikes are not symmetric, and an off-centered location leaves more room for the gear mechanisms of the bike which are typically placed on the right side of the bike.

Placed slightly rearward of the rearward wheel assembly 65 is a winch assembly 77 comprising a winch cylinder 78, a winch axle 80, a winch crank 82, and a winch handle 84. The winch axle 80 extends between the first sled side rail 52 and the second sled side rail 54, and positions the winch cylinder 78 between the two sled side rails 52 and 54. The winch crank 82 and winch handle 84 are used to rotate the winch cylinder 78. In an alternate embodiment, the winch assembly 77 can be motorized so that the winch assembly 77 will rotate at the push of a button which starts a motor (not shown). A nylon webbing 86, or other suitably flexible and strong material, is wrapped around the winch cylinder 78 and has a winch hook 88 attached to the end of the nylon webbing 86. The nylon webbing 86 is placed over the roller 34 (FIG. 1), and the winch hook 88 is attached to the loop 28 (FIG. 1) when raising and lowering the sled 50, as is further explained in the discussion below of the operation of the bike rack 10.

Attached to the sled forward end 58 is a first and a second ramp 90*a* and 90*b* respectively. The first and second ramp 90*a* and 90*b* comprises a first and a second ramp hook 92*a* and 92*b* respectively (better shown in FIG. 5) for positioning the sled 50 in a loading position. A forward wheel stop 102 comprises a first bar 89 attached between the first ramp 90*a* and the second ramp 90*b*.

Attached to the sled rearward end 60 is a landing gear assembly 94 comprising the landing gear axle 96, a first landing gear arm 98*a*, a second landing gear arm 98*b*, a first landing gear wheel 100*a*, and a second landing gear wheel 100*b*. A rearward wheel stop 104 comprises a second bar 103 attached between a first rearward post 105*a* and a second rearward post 105*b*.

Figure 5:
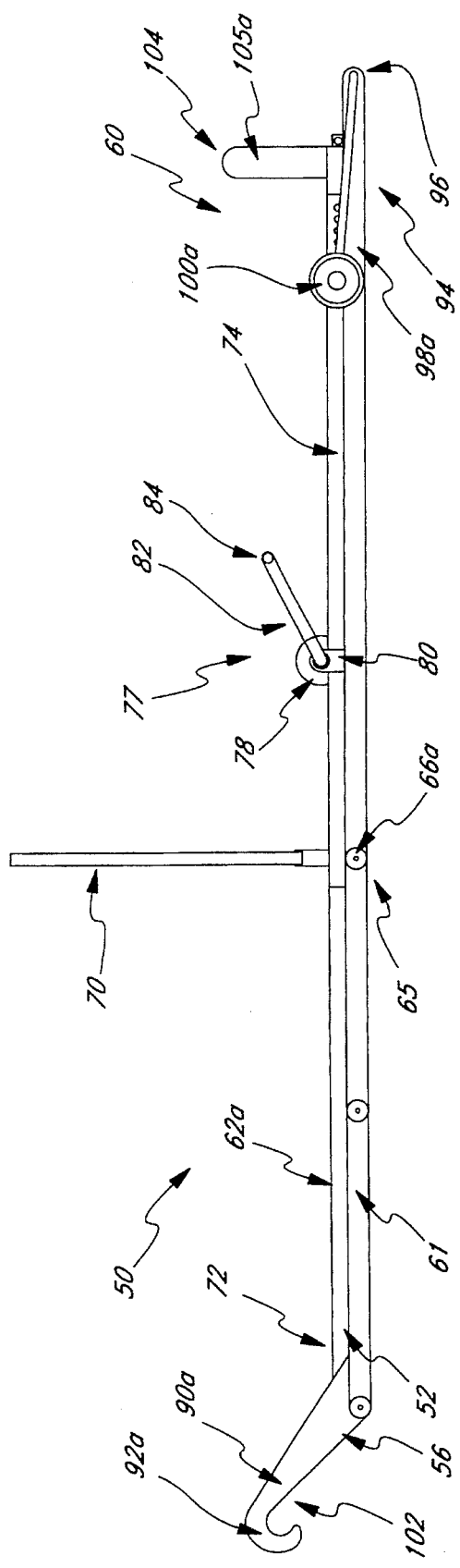
FIG. 5 is a side elevational view of the bike carrier sled.

FIG. 5 is a side view illustration of the sled 50 including the mast 70, first ramp 90*a*, first ramp hook 92*a*, and first rearward post 105*a*.

FIG. 6 is a rear view illustration of the sled 50 showing the mast 70, and rearward wheel stop 104, as well as the V-shape of the forward bike tray 72, and the first and second rearward bike trays 74 and 76.

FIG. 7 shows a cutaway forward view of the first channel 15*a* of the first side rail 14 illustrating the operation of the first forward sled wheel 62*a* and the first forward sled wheel axle 64 within the first channel 15*a* of the first side rail 14.

Operation of the Bike Carrier

FIGS. 8–18 are provided to illustrate the operation of the sliding ride-ready bike carrier 10. Starting from a locked traveling position, FIG. 8 shows the frame 12 mounted to a vehicle rooftop via frame mounts 24. Various frame mount configurations for mounting a rack system to the rooftop of a vehicle are known in the art. Thus, a specific configuration is not discussed in detail since the specific mounting embodiment is not essential to the operation of the present invention, so long as the frame mounts 24 securely retain the frame 12 to the rooftop of the vehicle.

Beginning from the locked traveling position, the sled 50 is secured within the frame 12 by engaging the landing gear axle 96 to the first and second lock blocks 33*a* and 33*b*. A bungee cord or simple clamping device can be used to hold the landing gear axle 96 down so that the lock blocks 33*a* and 33*b* restrain the sled 50 from moving upward. The first and second spring loaded latches 36*a* and 36*b* serve as redundant locking mechanisms to ensure that the sled 50 does not unintentionally release from the frame 12. The latches 36*a* and 36*b* are designed not to rotate rearward any further than its locked position, thereby preventing the sled 50 from sliding out of the frame 12.

In order to slide the sled 50 out of the frame 12, the landing gear assembly 94 portion of the sled 50 is lifted and pulled rearward over the first and second lock blocks 33*a* and 33*b*, and then the latches 36*a* and 36*b* are manually rotated forward in a downward manner out of the way of the landing gear axle 96 by actuating either latch 36*a* or 36*b*. With the landing gear axle 96 no longer obstructed by the latches 36*a* and 36*b*, the sled 50 is free to slide out from the frame 12 in a horizontal rearward direction.

The sled 50 is extracted from the frame 12 by pulling on the sled rearward end 60. The forward sled wheels 62*a* and 62*b*(FIG. 4) and the rearward sled wheels 66*a* and 66*b*(FIG. 4) roll along the first and second channels 15*a* and 15*b* (FIG. 1) from the forward end 20 of the frame toward the rearward end 22 of the frame 12.

When the sled 50 reaches the rearmost horizontal deployment position, the landing gear assembly 94 is deployed by unlocking the landing gear assembly 94 from the closed position (as shown in FIG. 9), and rotating the landing gear assembly 94 to the open position (as shown in FIG. 10). Any number of configurations commonly known in the art for enabling the landing gear assembly 94 to be locked into the closed and open position will suffice so long as the landing gear assembly 94 remains in the designated position until the user decides otherwise.

FIG. 11 shows the rearmost horizontal deployment position of the sled 50. This is because the first and second stop blocks 30*a* and 30*b*(FIGS. 1 and 2) on the first and second side rail 14 and 16 (FIG. 1) obstruct any further rearward motion of the first and second rearward sled wheels 66*a* and 66*b*. The stop blocks 30*a* and 30*b* are formed in the shape of a right triangle that is vertical in the forward portion, and ramps downward in the rearward direction. Thus, the rearward sled wheels 66*a* and 66*b* abuts against the vertical forward portion. Meanwhile, the forward wheel assembly 61 (FIG. 4) exerts an upward force on the frame 12 within the first and second channels 15*a* and 15*b* due to the weight of the sled rearward end 60 hanging out past the rearward end 22 of the frame 12. The rearward wheel assembly 65 exerts a downward force on the frame 12 since this point acts as a pivot point between the sled rearward end 22 and the sled forward end 20.

To continue the operation of the bike carrier 10, the sled 50 must be lifted upward and moved in rearward direction such that the rearward wheel assembly 65 clears the vertical portion of the stop blocks 30*a* and 30*b*, and rolls down the ramping portion of the stop blocks 30*a* and 30*b*. Once the rearward wheel assembly 65 clears the stop blocks 30*a* and 30*b*, the spring loaded latches 36*a* and 36*b*(FIG. 2), which spring back to the locked position, latches onto the rearward wheel assembly 65, thereby causing the rearward wheel assembly 65 to act as a pivot point. In this position, the sled 50 is free to pivot on the rearward wheel assembly 65, with the first and second forward sled wheels 62*a* and 62*b* pivoting out of the first and second channels 15*a* and 15*b* through the first and second frame slots 40*a* and 40*b* (FIG. 1).

The first and second wheel guides 38*a* and 38*b*(FIG. 1) are designed to guide the first and second forward sled wheels 62*a* and 62*b* back into the first and second frame slots 40*a* and 40*b* when operation of the bike carrier 10 is reversed. The wheel guides 38*a* and 38*b* also provide structural support to a portion of the first and second side rail 14 and 16 that is weakened by the missing portions removed to create the frame slots 40*a* and 40*b*.

The procedure described above that requires the user to lift and pull the sled 50 up and over the stop blocks 30*a* and 30*b* verifies that the user is able to lift and move the weight of the sled 50 before the system releases the sled 50 from the locked horizontal position to an unlocked pivoting position.

With the rearward wheel assembly 65 restrained by the spring loaded latches 36*a* and 36*b*, thereby acting as a fixed pivot point for the sled 50, the center of gravity of the sled 50 and any attached payload is located close to the rearward wheel assembly 65. Therefore, the user only needs to exert a minimal amount of upward force against the sled rearward end 60 to control gravity's downward rotational force on the rear half of the sled 50.

In a typical configuration with three bikes attached, the upward offsetting force required by the user during the gravitational downward rotation of the sled 50 is no greater than 30 pounds. During this downward rotation, the spring loaded latches 36*a* and 36*b* provide lateral support to the first and second sled side rails 52 and 54 (FIG. 4), thereby preventing the sled 50 from tipping sideways. FIG. 12 shows the sled 50 in the act of downward rotation. For clarity, the user is not shown in the illustration.

The sled 50 continues to pivot about the rearward wheel assembly 65 until the landing gear assembly 94 makes contact with the ground. This position is called the grounded position, and is shown in FIG. 13. When the grounded position is reached, the user unwinds some of the nylon webbing 86 from the winch cylinder 78 and places the nylon webbing 86 over the roller 34, and then connects the winch hook 88 to the loop 28, as shown in FIG. 14. The user then cranks the winch assembly 77 in an appropriate direction so that the sled 50 travels slightly upward. This enables the user to rotate the latches 36*a* and 36*b* forward so as to clear the rearward wheel assembly 65. Then, the winch assembly 77 is cranked in the opposite direction to lower the rearward wheel assembly 65 past the latches 36*a* and 36*b*.

The underside of the sled 50 rolls along the roller 34, and the sled rearward end 60 rolls along the ground via the landing gear assembly 94, while the winch cylinder 78 controls the lowering speed of the sled 50 via the winch assembly 77, nylon webbing 86, and loop 28 (user operating the winch assembly 77 is not shown). In this manner, the sled 50 is gradually lowered to the point where the forward wheel assembly 61 comes into contact with the spring loaded latches 36*a* and 36*b*, as shown in FIG. 15. The latches 36*a* and 36*b* must be rotated down in a forward direction so as to clear the forward wheel assembly 61, in the manner described previously (as shown in FIG. 16, without the user), to continue the lowering of the sled 50.

The latches 36*a* and 36*b* and the forward wheel assembly 61 act as a safety restraint to catch the sled 50 in case the winch hook 88 is improperly attached to the loop 28, or in case the winch handle slips from the users hands. Once the latches 36*a* and 36*b* are rotated out of the way, the user continues winding the winch assembly 77 in the appropriate direction to continue lowering the sled 50. The forward wheel assembly 61 is lowered past the latches 36*a* and 36*b*, as shown in FIG. 17. The latches 36*a* and 36*b* spring back into the locked position, but there are no longer any more protrusions from the sled 50 to abut against the latches 36*a* and 36*b*.

When the sled forward end 58 rolls past the roller 34 as the sled 50 is being lowered, the first and second ramp 90*a* and 90*b* (FIG. 5) rolls over the roller 34 until the first and second ramp hooks 92*a* and 92*b* (FIG. 5) grab onto the roller 34. At this point, the sled 50 has reached its lowest operating position, called the loading position, as shown in FIG. 18.

Since the sled rearward end 60 is raised upward by the landing gear assembly 94, and the sled forward end 58 is lowered below the frame 12 via the ramps 90a and 90b and ramp hooks 92a and 92b, the angle of the sled 50 is more level to the ground, thereby increasing the convenience of the bike carrier 10 when attempting to mount bikes to the bike carrier 10.

In the loading position, one or more bikes can be mounted to the bike carrier 10, depending upon the number of bike trays available. In a preferred embodiment, there are three bike trays available, although this number can be increased or decreased in a simple manner by adjusting the width of the bike carrier 10.

The procedure for the loading and unloading of bikes onto the forward bike tray 72, first rearward bike tray 74, and second rearward bike tray 76, are as follows. A first bike is placed on the forward bike tray 72, with the front wheel abutting against the forward wheel stop 102. The front and rear wheels are attached to the bike tray via wheel attachments 106. Although one wheel attachment 106 is sufficient, the use of more than one wheel attachment 106 provides improved stability, by reducing the rotation of the bike's front wheel relative to the bike frame.

For additional stability, the front wheel of the first bike is attached to the forward wheel stop 102 and the rear wheel is attached to the inside of the mast 70 via wheel attachments 106. Due to the gear mechanism located on the right side of a typical bike, it is preferred to attach the first bike's rear wheel to the inside of the mast 70 closest to the first rearward bike tray 74.

A second bike is place on the first or second rearward bike tray 74 or 76. The front and rear wheels are attached to the bike tray via at least one wheel attachment 106. For additional stability, the front wheel is attached, via wheel attachments 106, to the outer side of the mast 70 on the side closer to the bike tray that the bike is mounted upon, and the rear wheel is attached to the rearward wheel stop 104 via wheel attachments 106.

A third bike is place on the remaining rearward bike tray 74 or 76 in a similar manner, but in the opposite direction of the second bike. Since bikes are generally not symmetric, it is preferable to position the second and third bikes so that they are facing in opposite directions. This enables the bikes to be placed closer together, without interference of the gear mechanisms or handle bars, thereby providing increased aerodynamic benefits as a result of decreased frontal volume.

Figure 19:
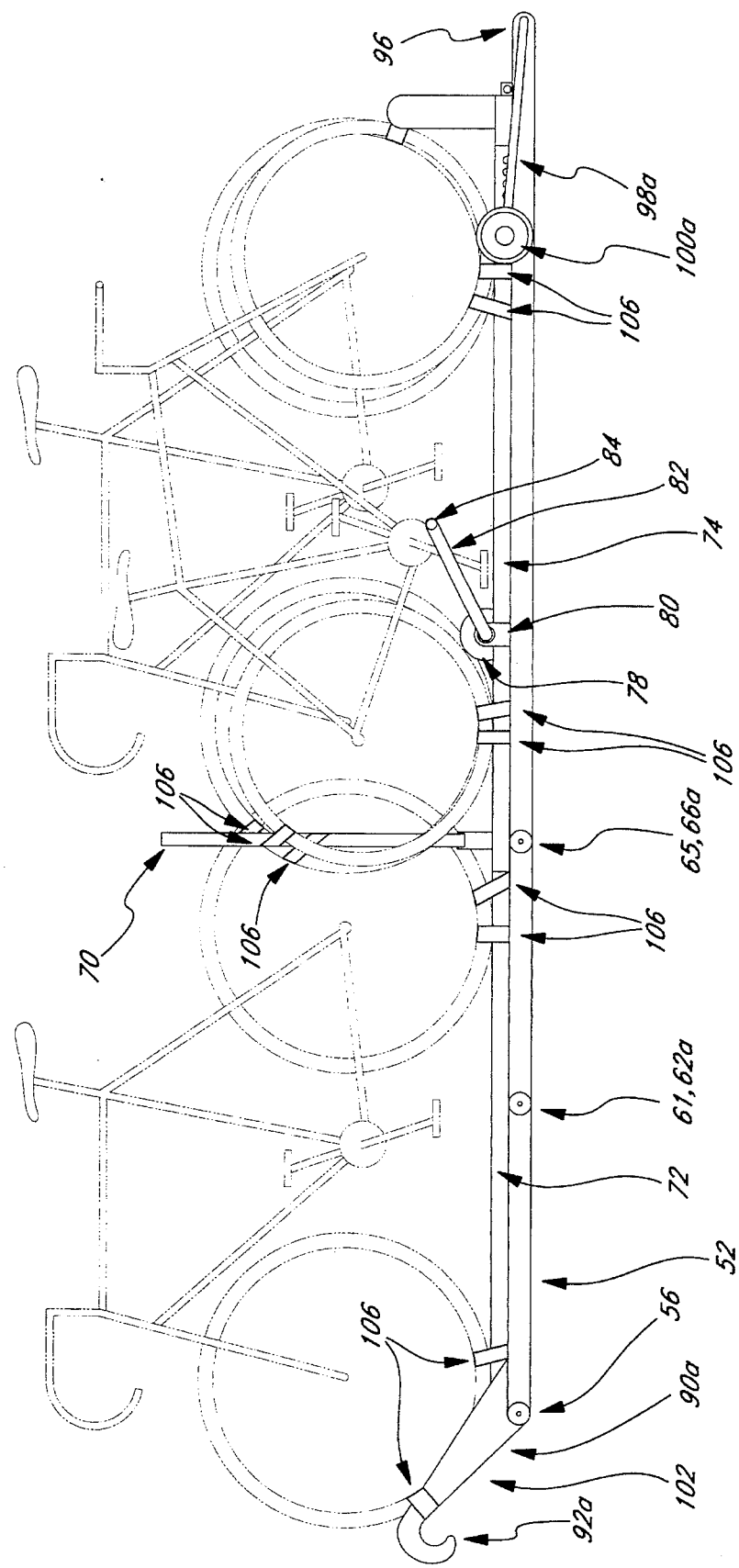
FIG. 19 is a side elevational view of three bikes properly mounted to the bike carrier sled via wheel attachments. The bikes are staggered, with the two rearward bikes facing in opposite directions, thereby reducing the aerodynamic drag created by transporting these bikes on the rooftop of the vehicle.
Figure 26:
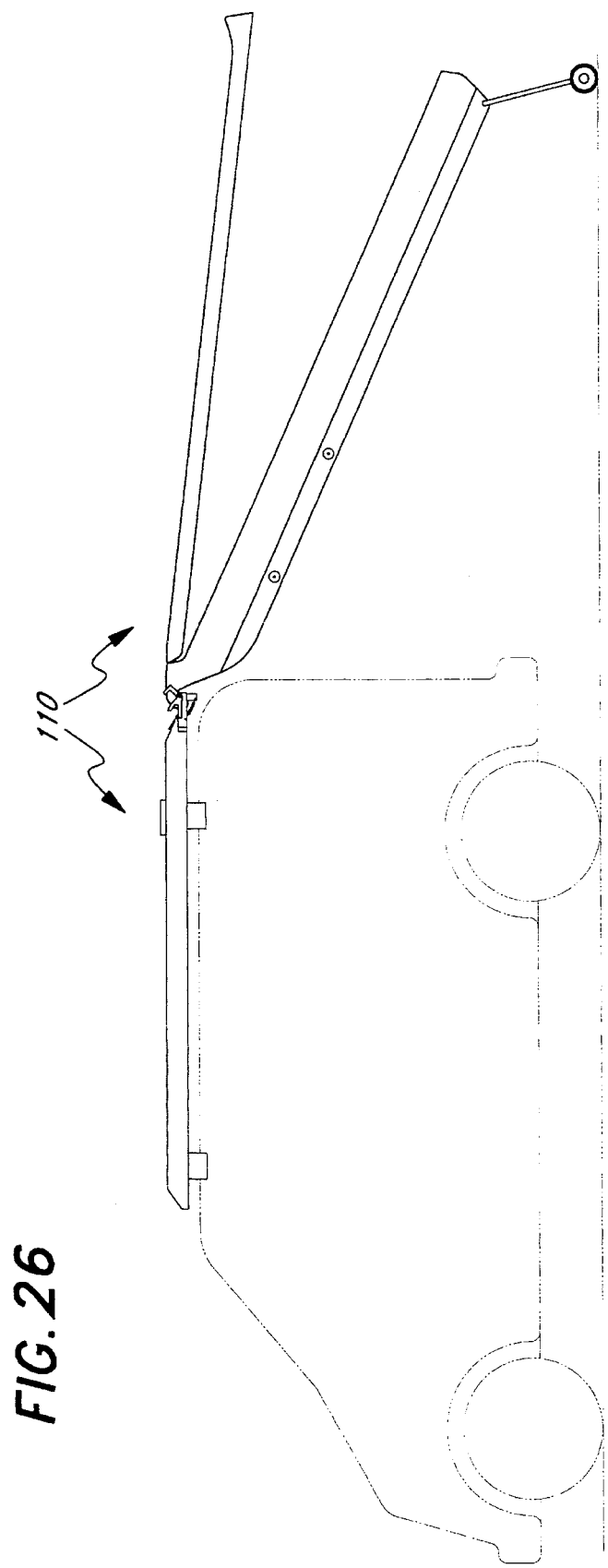

At this point, one half of the entire operational cycle has been described. In order to go from the loading position back to the grounded position and then to the traveling position, the user ensures that the bikes are properly mounted, as shown in FIG. 19, and then reverses the steps described above. Briefly, the user raises the sled 50 to the grounded position through the use of the winch assembly 77. The latches 36a and 36b do not come into play since the upward movement of the sled 50 will automatically rotate the latches 36a and 36b in a forward manner so as to clear the latches 36a and 36b out of the way.

The user then disengages the winch hook 88 and the loop 28, and lifts the sled rearward end 60 upward, thereby pivoting the sled 50 back to the horizontal position. The forward wheel assembly 61 is guided back into the first and second frame slots 40a and 40b by the first and second wheel guides 38a and 38b. The sled 50 is then pushed forward, and the rearward wheel assembly 65 rolls up the ramp portion of the first and second stop blocks 30a and 30b and then drops past the vertical portion. At this point, the forward wheel assembly 61 is securely positioned into the first and second channels 15a and 15b, thereby preventing the sled 50 from pivoting.

With the sled 50 secure in a horizontal position, the landing gear assembly 94 is rotated to the closed position. The sled 50 is then rolled down the frame 12 in the forward direction until the landing gear axle 96 passes over the latches 36a and 36b, rolls up and over a ramp portion of the first and second lock blocks 33a and 33b, and drops into a portion of the lock blocks 33a and 33b designed to retain the landing gear axle 96 in a secure and locked position. The lock blocks 33a and 33b are shaped similarly to the stop blocks 30a and 30b, and operate in a similar manner, except that the lock blocks 33a and 33b provide an additional downward force on the landing gear axle 96. The latches 36a and 36b spring back to its closed position, thereby acting as a redundant locking mechanism to prevent the sled 50 from sliding in a rearward direction.

FIGS. 20 through 26 are side views of the vehicle roof-mounted sliding enclosed cargo compartment carrier 110 shown with the frame 12 mounted onto the rooftop, and the cargo compartment 112 portion in the various stages of operation. This is another alternative embodiment of the vehicle roof-mounted sliding carrier of the present invention. By integrating the enclosed cargo compartment 112 into the sliding carrier, the ease-of-access benefits of the present invention are available to users requiring storage of cargo such as luggage, as contrasted to the storage of bikes.

Any modifications which may be required to implement this embodiment are straight-forward and minimal, and are easily carried out by a person of ordinary skill in the art.

While the above description contains many specificities, these should not be construed as limitations on the scope of the invention, but rather as an exemplification of one preferred embodiment thereof. Many other variations are possible.

For example, the number of bike trays attached to the sled 50 can be varied by varying the width of the frame 12 and the sled 50 of the sliding ride-ready bike carrier 10. The length of the bike trays can also be varied to accommodate tandem bikes. In addition, considering that there are users who prefer to fork-mount their bikes, the sliding ride-ready bike carrier 10 can easily be adapted into a sliding fork-mount bike carrier by modifying the bike trays in a manner well known in the art.

Furthermore, the concepts embodied in the frame and sled configuration are easily adaptable to various other types of rooftop carriers. For example, a sled can be designed as a luggage rack for externally mounting luggage, rather than as an enclosed cargo compartment integral to a sled. The full scope of the invention is to be determined by the claims, which follow.

What is claimed is

1. A sliding carrier comprising a frame capable of being mounted to a vehicle rooftop, a sled adaptable for receiving various objects, said sled being in sliding communication with said frame, a lock block connected to said frame for retaining said sled within said frame during a locked traveling position, a stop block integral to said frame for indicating a horizontal deployment position of said sled withdrawn from said frame, a wheel assembly connected to said sled for enabling said sled to pivot about said wheel assembly once said sled reaches said horizontal deployment position, at least one ramp comprising a ramp hook for allowing a forward end of said sled to be lowered the additional length of said ramp, thereby placing said sled into a more horizontal and accessible position, a landing gear assembly connected to a rear portion of said sled for enabling said sled to roll along the ground, and a winch assembly connected to said sled for securing said sled to said frame, and for controlling the lowering of said sled from a grounded position to a loading position.

2. The sliding carrier of claim 1, wherein said frame comprises a first side rail and a second side rail, said first side rail comprises a first frame slot,
said second side rail comprises a second frame slot, said sled comprises a forward wheel assembly that aligns with said first and said second frame slots when said sled reaches said horizontal deployment position.

3. The sliding carrier of claim 1, wherein said sled comprises an integral enclosed cargo compartment.

4. The sliding carrier of claim 2, wherein said sled comprises an integral enclosed cargo compartment.

5. The sliding carrier of claim 1, wherein said sled is adapted for receiving at least one bike.

6. A sliding ride-ready bike carrier comprising a frame capable of being mounted to a vehicle rooftop, a sled for receiving at least one bike, said sled being in sliding communication with said frame, a lock block connected to said frame for retaining said sled within said frame during a locked traveling position, a stop block integral to said frame for indicating a horizontal deployment position of said sled withdrawn from said frame, a wheel assembly connected to said sled for enabling said sled to pivot about said wheel assembly once said sled reaches said horizontal deployment position, at least one ramp comprising a ramp hook for allowing a forward end of said sled to be lowered the additional length of said ramp, thereby placing said sled into a more horizontal and accessible position, a landing gear assembly connected to a rear portion of said sled for enabling said sled to roll along the ground, and a winch assembly connected to said sled for securing said sled to said frame, and for controlling the lowering of said sled from a grounded position to a loading position.

7. The sliding ride-ready bike carrier of claim 6, wherein said frame comprises a first side rail and a second side rail, and said sled comprises a first sled side rail and a second sled side rail.

8. A sliding ride-ready bike carrier comprising a frame capable of being mounted to a vehicle rooftop, said frame comprising a first side rail and a second side rail, a sled for receiving at least one bike, said sled being in sliding communication with said frame, and said sled comprising a first sled side rail and a second sled side rail, a lock block connected to said frame for retaining said sled within said frame during a locked traveling position, a stop block integral to said frame for indicating a horizontal deployment position of said sled withdrawn from said frame, a wheel assembly connected to said sled for enabling said sled to pivot about said wheel assembly once said sled reaches said horizontal deployment position, a landing gear assembly connected to a rear portion of said sled for enabling said sled to roll along the ground, a winch assembly connected to said sled for securing said sled to said frame, and for controlling the lowering of said sled from a grounded position to a loading position, and a latch that is spring loaded such that said latch obstructs the incremental extraction of said sled from said frame unless said latch is manually rotated downward in a forward direction so as to clear a protrusion extending from said sled.

9. The sliding ride-ready bike carrier of claim 8, wherein said stop block is shaped such that said sled must be lifted and pulled in a rearward direction in order to be extracted from said frame, and said sled only needs to be pushed in a forward direction in order to be inserted into said frame.

10. The sliding ride-ready bike carrier of claim 9, wherein said first side rail comprises a first channel, said second side rail comprises a second channel, said wheel assembly comprises a first wheel, a second wheel, and a wheel assembly axle, and said first and second wheels being designed to roll within said first and second channels respectively, thereby enabling said sled to slide forward and rearward with respect to said frame.

11. The sliding ride-ready bike carrier of claim 10, wherein said frame further comprises a loop crossmember, said loop crossmember comprising a loop, and said winch assembly of said sled comprising a flexible material wrapped around a winch cylinder, said flexible material connected to a winch hook, whereby said sled is capable of being secured to said frame by hooking said winch hook to said loop.

12. The sliding ride-ready bike carrier of claim 11, wherein said winch assembly is motorized.

13. The sliding ride-ready bike carrier of claim 11, wherein said sled further comprises a plurality of bike trays positioned in a staggered configuration.

14. The sliding ride-ready bike carrier of claim 13, wherein said plurality of bike trays are adapted to receive bikes in a fork-mount configuration.

15. A sliding ride-ready bike carrier comprising a frame capable of being mounted to a vehicle rooftop, said frame comprising
a first side rail,
a second side rail,
a loop crossmember,
said loop crossmember comprising a loop, a sled for receiving a plurality of bikes, said sled being in sliding communication with said frame,
said sled comprising
a first sled side rail comprising a first channel,
a second sled side rail comprising a second channel,
a plurality of bike trays positioned in a staggered configuration, a lock block connected to said frame for retaining said sled within said frame during a locked traveling position, a latch being spring loaded such that said latch obstructs the incremental extraction of said sled from said frame unless said latch is manually rotated downward in a forward direction so as to clear a protrusion extending from said sled, a stop block integral to said frame for indicating a horizontal deployment position of said sled withdrawn from said frame, said stop block being shaped such that said sled must be lifted and pulled in a rearward direction in order to be extracted from said frame, and said sled only needs to be pushed in a forward direction in order to be inserted into said frame.

a wheel assembly connected to said sled for enabling said sled to pivot about said wheel assembly once said sled reaches said horizontal deployment position, said wheel assembly comprising
a first wheel,
a second wheel,
a wheel assembly axle,
said first wheel and said second wheel being designed to roll within said first channel and said second channel respectively, thereby enabling said sled to slide forward and rearward with respect to said frame, a landing gear assembly connected to a rear portion of said sled for enabling said sled to roll along the ground, a winch assembly connected to said sled for securing said sled to said frame, and for controlling the lowering of said sled to a loading position, and said winch assembly of said sled comprising a flexible material wrapped around a winch cylinder, said flexible material connected to a winch hook, whereby said sled is capable of being secured to said frame by hooking said winch hook to said loop.

16. A method for operating a vehicle roof-mounted sliding carrier, comprising the following steps:

releasing a sled adaptable for carrying certain objects from a roof-mounted frame, wherein said sled is in sliding communication with said frame, extending said sled to a horizontal deployment position, releasing said sled from a fixed horizontal plane of travel to a pivoting plane of travel, pivoting said sled downward until a rearward portion of said sled reaches a grounded position, engaging a winch assembly from said sled to said frame to control the lowering of said sled from said grounded position to a loading position, operating said winch whereby said sled is lowered to said loading position, said loading position being when a forward end of said sled comprising at least one ramp having a ramp hook, used for allowing said forward end of said sled to be lowered the additional length of said ramp, hooks onto a roller, thereby placing said sled into a more horizontal and accessible position, loading said certain objects onto said sled, raising said sled up to said grounded position with said winch, pivoting said sled back to a fixed horizontal plane of travel, pushing said sled forward into said frame, and locking said sled into a traveling position within said frame.

* * * * *